United States Patent
Kellner et al.

(10) Patent No.: US 9,403,709 B2
(45) Date of Patent: Aug. 2, 2016

(54) METHOD FOR CONTROLLING THE PROCESS PARAMETERS OF A GLASS FORMING MACHINE

(71) Applicant: HEYE INTERNATIONAL GMBH, Ombernkirchen (DE)

(72) Inventors: Michael Kellner, Bad Salzuflen (DE); Ralf Schottelndreier, Nienstadt (DE); Kai Bindewald, Stadthagen (DE); Roland Fiedler, Laasdorf (DE)

(73) Assignee: HEYE INTERNATIONAL GMBH, Obernkirchen (DE)

( * ) Notice: Subject to any disclaimer, the term of this patent is extended or adjusted under 35 U.S.C. 154(b) by 0 days.

(21) Appl. No.: 14/376,115

(22) PCT Filed: Jan. 28, 2013

(86) PCT No.: PCT/EP2013/000236
§ 371 (c)(1),
(2) Date: Jul. 31, 2014

(87) PCT Pub. No.: WO2013/113486
PCT Pub. Date: Aug. 8, 2013

(65) Prior Publication Data
US 2015/0107302 A1    Apr. 23, 2015

(30) Foreign Application Priority Data
Feb. 3, 2012 (DE) .......................... 10 2012 002 016

(51) Int. Cl.
*C03B 9/41* (2006.01)
*G01B 11/24* (2006.01)

(52) U.S. Cl.
CPC . *C03B 9/41* (2013.01); *G01B 11/24* (2013.01); *Y02P 40/57* (2015.11)

(58) Field of Classification Search
CPC .......................................................... C03B 9/41
USPC ........................................................ 65/29.11
See application file for complete search history.

(56) References Cited

U.S. PATENT DOCUMENTS 6,089,108 A    7/2000    Lucas
2004/0194506 A1    10/2004    Ueda et al.

FOREIGN PATENT DOCUMENTS

| | | |
|---|---|---|
| DE | 2922499 A1 | 12/1979 |
| DE | 3742501 A1 | 7/1988 |
| DE | 10116099 A1 | 10/2002 |
| DE | 102006003330 A1 | 7/2007 |
| DE | 102009005433 A1 | 7/2010 |
| EP | 0151339 B1 | 1/1988 |
| EP | 0574349 A1 | 5/1993 |
| EP | 1418158 A1 | 5/2004 |
| WO | 2008027569 A2 | 3/2008 |

*Primary Examiner* — Angela Ortiz
*Assistant Examiner* — Russell Kimmerle, III
(74) *Attorney, Agent, or Firm* — Jennifer S. Stachniak

(57) ABSTRACT

In a method for controlling the process parameters of a machine for producing hollow glass articles, the shape of the produced hollow glass article is measured online by means of at least one camera immediately after its shaping. Deviations from a reference shape are detected, and these deviations are used as the basis of the control. The control is a storage medium that contains a mechanical model describing the functional correlation between a certain pattern of a deformation of the hollow glass article and an adjustment of process parameters. An intervention in the adjustments of process parameters is carried out in accordance with the type of deformation detected.

4 Claims, No Drawings

METHOD FOR CONTROLLING THE PROCESS PARAMETERS OF A GLASS FORMING MACHINE

The instant application should be granted the priority dates of Feb. 3, 2012, the filing date of the corresponding German patent application 10 2012 002 016.3, as well as Jan. 28, 2013, the filing date of the international patent application PCT/EP2013/000236.

BACKGROUND OF THE INVENTION

The invention pertains to a method for controlling the process parameters of the working process of a glass forming machine, particularly an I.S. machine.

The production of hollow glass articles from molten glass in a glass forming machine by means of a shaping process, which is carried out on a prepared glass tear by means of a blank mold for producing a blank and a finish mold for producing a finished product and in which the finished product is transferred onto a conveyor belt leading into an annealing furnace via a dead plate, is characterized by several stations and transport processes, the respective operating parameters of which need to be adjustable and monitored with respect to a reproducible production result of constant quality. This applies to all parameters that influence the shaping process.

The quality of the hollow glass article produced in this way depends, in particular, on the stability of the entirety of all machine adjustments, the environmental conditions, the properties of the glass tear to be processed and of the article to be produced such as, among other things, its shape and the corresponding mass distribution of the glass. Other unavoidable interfering effects are caused by wear-related changes on machine elements, as well as environmental temperature fluctuations and frequently need to be counteracted with manual interventions in operating sequences. However, manual interventions are always dependent on the personal experience of the respective person carrying out the intervention, wherein machine adjustments are usually carried out such that a safety margin from critical adjustments is ensured. In many instances, this results in an incomplete utilization of the production capacity and therefore a reduction of the article throughput. The assurance of a constant product quality and the fullest possible utilization of the production capacity therefore are priority objectives for the operation of a glass forming machine.

According to DE 10 2006 003 330 A1, it is known to equip a glass forming machine with a thermal imaging camera that can be moved along the multiple stations in order to generate thermal images of the individual blank-molding tools and finish-molding tools that can be converted into control variables in a control device of a cooling apparatus such that individually adapted cooling air currents can be delivered to the individual molding tools, namely on the side of the blank molds, as well as on the side of the finish molds. In this way, the deformation conditions in the molding tools should be evened out, stabilized and optimized such that a uniform mass distribution of the glass in the produced glass article, a reduction of the required cooling air quantity and prolonged service lives of the molding tools can be achieved. The generation of the control variables is based on nominal values for the temperature of the molding tools stored in the control device such that the volume of the respective cooling air currents is adjusted in dependence on the deviation from these nominal values. This concerns a classic control circuit that, however, is only able to measure a partial aspect, namely the temperature ratios of the molding tools.

A similar method is known from EP 0 151 339 B1, wherein a thermal imaging camera can be pivoted about a vertical axis and respectively generate images of two stations of the glass forming machine in order to accelerate the imaging of the temperature ratios of the molding tools.

The method for controlling a glass forming machine known from DE 37 42 501 C2 is characterized in that the finished hollow glass product is inspected with respect to the presence of faults such as cracks or fissures after it has been cooled, wherein a fault signal that describes the detected fault is generated, the fault signals are analyzed in accordance with predefined and stored correction algorithms and the operating parameters of the glass forming machine are corrected in accordance with these algorithms. This correction is repeated with a time delay that is dependent on the manufacturing time and the cooling time. Corrective measures are taken with respect to the parameters of the blowing process in the respective mold and concern pressure changes, for example, of the blank blowing pressure or the final blowing pressure, changes of the blowing time, for example, of the blank blowing time, the final blowing time, etc., and temperatures such as, for example, a glass outflow temperature. This method is an iterative correction method that is executed automatically and intended to homogenize the quality of the produced hollow glass articles. However, this method does not function online such that the initiated corrective measures can only become effective with a certain time delay.

Due to an improved computer capacity, computer-assisted image analysis methods are becoming more and more popular as the basis for controlling the machine adjustments of glass forming machines because they make it possible to incorporate numerous influencing variables into the control algorithm.

For example, EP 1 418 158 A1 discloses a method and a device for controlling the quality of a glass tear in the shaping process of a glass forming machine, wherein a glass tear is in a free fall recorded by means of one or more cameras and a data set that describes a three-dimensional structure is generated, wherein this data set is compared with a corresponding stored standard data set with respect to the volume, surface shape, length, thickness, cut surface, etc. of the glass tear, and wherein machine adjustments are changed in dependence on this comparison, particularly on the type of deviation detected. In this quality control, a selection from several available machine parameters is therefore carried out in dependence on the type of deviation detected, namely the machine parameters that concern the glass tear formation, such that an intervention that is adapted to the type of the detected deviation from the standard data set can be realized.

EP 0 574 349 A1 discloses a method for monitoring the production sequence of a glass forming machine that is based on sensors in the form of IR cameras, CCD cameras, etc. and focuses, in particular, on fault sources in the cutting mechanism for a glass tear, the closure mechanism of the mold, the funnel mechanism for the supply of the molten glass, the level mechanism for the molten glass, as well as the dead plate. The image signals generated by means of the sensors upstream of a heater are analyzed in a computer-assisted fashion and this information is used for correcting possibly detected deficiencies. This control of machine adjustments is based on a nominal state of these adjustments.

U.S. Pat. No. 6,089,108 A discloses a device or an arrangement that is intended for use on the "hot end" of a glass forming machine and serves for optically measuring shaped-related parameters of hollow glass articles standing on a conveyor belt, namely by utilizing several cameras arranged in protective housings. These cameras are connected to a computer that is designed for additionally processing the image data generated by the cameras. This image data processing focuses on detecting misalignments of the individual hollow glass articles standing on the conveyor belt in the longitudinal and the lateral direction of the belt, as well as on carrying out a correction of the different size ratios of the cameras that record the hollow glass article from different viewing angles, such that an exact measurement of geometric parameters is realized despite these misalignments. This image data processing furthermore focuses on detecting an oblique axis of the hollow glass article relative to the horizontal support surface and on compensating potential motions of the hollow glass article relative to the support surface. However, this document merely aims to obtain information on the shape-related status of the hollow glass articles at an early stage on the hot end of the glass forming machine in order to discard articles with unacceptable shape-related parameters.

Document WO 2008/027569 A2 discloses a device that is intended for use in a system for molding plastic articles, in this case PET containers, in order to check the molded containers, namely by utilizing an arrangement of LED light sources, e.g. in the form of laser diodes, and photoreceivers in the form of sensors arranged opposite of the light sources. In this case, the transmission and the absorption behavior of the walls of the container is examined between the arrangements of light sources and sensors in two different wavelength ranges, wherein this examination focuses on the wall thickness of the containers, their mass, their volume and their material distribution. However, the signals received from the photoreceivers are primarily used for sorting out articles that do not meet defined standards based on the measuring results represented by these signals.

Another monitoring system for a glass forming machine that is based on a computer-assisted image analysis and intended for analyzing motion sequences is known from DE 10 2009 005 433 A1. In this case, one or more high-speed cameras are displaceably or pivotably arranged along the multiple I.S. stations and the image sequence of these cameras is used as the basis for detecting deviations from construction data, for preventive upkeep and maintenance work, for detecting a current state of wear, for reducing idle times and ultimately for control-technological interventions into the process sequence, among other things, in order to avoid time losses, to already detect damages at an early stage and to collectively achieve an increased throughput.

This prior art indicates that it was until now attempted to homogenize the product quality based on an analysis of the operating parameters of the glass forming machines such as, e.g., the molding tools, the glass tears to be formed or faults of the glass article in the form of cracks or fissures. However, intolerable aberrations detected in this way were always used exclusively for their correction insofar as a functional correlation exists between these aberrations and the operating parameters to be readjusted. This prior art is based on a measurement of temperatures in the region of the molding tools, of cooling air currents or of characteristic parameters that describe a glass tear, as well as on motion ratios.

In this context, however, properties of the produced hollow glass articles such as, e.g., deviations from a reference shape are not taken into account, wherein the mechanical stability of the hollow glass article that depends, among other things, on the mass distribution and is still low at the end of the shaping process due to comparatively high temperatures particularly needs to be taken into account. For example, each hollow glass article has its own temperature-dependent deformation behavior in dependence on the type of hollow glass article.

This prior art does not indicate that the thusly obtained information with respect to deviations between the shape of the hollow glass article and a reference shape was used in a control that focuses on eliminating the detected deviations.

SUMMARY OF THE INVENTION

It is the objective of the invention to enhance a method of the initially cited type with respect to a purposeful control of process parameters of a glass forming machine that takes into account, in particular, properties of the hollow glass article to be produced and can be used, among other things, as the basis for quality assurance, as well as for an improved utilization of the capacity of the shaping process.

DESCRIPTION OF SPECIFIC EMBODIMENTS

It is therefore essential for the invention that the state of the produced hollow glass article immediately after its shaping is used as the basis of the inventive control method. This shaping is carried out, for example, in an I.S. glass forming machine on a glass tear with a specific mass and a specific temperature that defines its flow or deformation behavior, namely in a two-stage shaping process, and ends on a dead plate, from which the finally formed article is transferred into an annealing furnace by means of a conveyor belt. According to the invention, the recording of the images of the articles preferably takes place while they stand on the conveyor belt and focuses on detecting and subjecting any geometric distortion, drunkenness and the like to an analysis. With respect to the required accuracy, it is advantageous to utilize at least one camera with a measuring accuracy of <0.01 mm. Since the shape of the produced article therefore is measured immediately after its shaping, it is possible to intervene in the shaping process with a minimal delay when deviations from a reference shape are detected in order to correct these deviations. Disturbance variables for a control are fluctuations in the cooling air temperature that are dependent, e.g., on the time of day, as well as on the time of year.

Due to the complex correlation between the result of the shaping process and the respective current adjustments of the process parameters, a storage medium is advantageously incorporated into the control method and describes the functional correlation between the values of the process parameters and certain shape-related changes of the article. This storage medium fulfills the function of a database and therefore contains a mechanical model that describes the deformation behavior of the article in dependence on numerous influencing variables, wherein this storage medium consequently forms the basis for control-technological interventions in dependence on the type of detected shape-related deviations of the article.

The method can be used online and therefore as the basis for an automated control of the process parameters of the shaping process, for example, in order to quickly and effectively counteract wear-related changes, as well as fluctuations of the environmental conditions, and to thusly assure a constant product quality.

The storage medium is based on a pattern of the deformation of the article in dependence on the values of the process parameters, i.e. a mechanical model that describes the deformation behavior of the hollow glass article. Such a model or pattern can be determined empirically and ultimately describes the correlation between a certain deformation of the article and the respective current adjustments of the process parameters. It has been determined that a functional correlation exists between the current adjustments of the process parameters and the deformation behavior of the article at the end of the shaping process in dependence on the type of article produced, for example its mass distribution, wherein this functional correlation can be used for the control-technological correction of detected shape-related deviations from a reference article.

The measurement of the article is preferably carried out by means of several cameras, for example three cameras that are uniformly distributed around the article and arranged stationarily, while the article is in a standing position on the conveyor belt. However, other positions are not excluded, particularly if they assigned directly to the end of the shaping process.

In any case, the measurement should be carried out, if possible, immediately after the shaping process and therefore while the article is still in a thermally related unstable state. The latter usually does not allow an in fact desirable rotation of the article about its longitudinal axis for measuring purposes, namely not even with consideration of increasing throughputs of the shaping process that as such are already associated with high mechanical stresses of the article.

In order to further improve the information on the produced hollow glass article on the input side, it is proposed to also utilize an image in the IR range in addition to an image in the visible range. This image can be used, for example, for detecting the mass distribution of the glass such that an automated adaptation of the process parameters to different hollow glass articles can also be realized in connection with a reference image in the IR range. An analysis of IR information can be carried out in connection with the respective current adjustments of the process parameters in order to obtain a broader basis for control-technological interventions.

It is furthermore the objective of the invention to propose a utilization for the above-described method, in which the operation of a glass forming machine is largely automated and independent of manual interventions and the empirical values, on which these interventions are based.

The inventive method is accordingly used for optimizing the adjustments of the process parameters in that an optimal value of a process parameter is iteratively reached, wherein changes of the shape of the article are compensated by controlling the other process parameters. In this way, fluctuating values of individual process parameters can be changed until a system limit, e.g. a stability limit, is reached without having to observe the unavoidable safety margin in manual interventions.

The number of shear cuts per unit time of the shaping process may be the process parameter to be optimized, particularly to be maximized.

It is obvious that the invention not only makes it possible to realize an automated control of the shaping process, for example, in an I.S. machine, but also a more economical utilization of its production capacity in that the number of shear cuts per unit time can be increased until the stability limit is reached.

It is furthermore obvious that a detected deviation from a reference shape of the article, namely the type of a deformation, is conversely used for correcting the adjustments of the potential process parameters. This makes it possible to realize a qualitatively improved work result that can be quickly reached in accordance with the speed of an intervention in response to detected deviations and is characterized by a narrower tolerance band with respect to shape-related deviations than the prior art. This feedback-type quality control likewise contributes to a more economical utilization.

The specification incorporates by reference the disclosure of German 10 2012 002 016.3, filed Feb. 3, 2012, as well as international application PCT/EP2013/000236, filed Jan. 28, 2013.

The present invention is, of course, in no way restricted to the specific disclosure of the specification and drawings, but also encompasses any modifications within the scope of the appended claims.

The invention claimed is:

1. A method for shaping hollow glass articles from droplets of molten glass in a glass shaping machine, comprising:
producing a blank in a blank-molding process;
transferring said blank to a finish-molding process;
producing a finished product from said blank in the finish-molding process;
transferring said finished product to a dead plate;
cooling said finished product on the dead plate in a cooling process;
transferring said finished product from said dead plate into an annealing furnace via a conveyor belt for an annealing process,
wherein all process parameters of the blank-molding process, the finish-molding process, the cooling process and the annealing process are adjustable;
providing at least one camera arranged stationary;
providing a storage medium that comprises a mechanical model, said mechanical model describing a functional correlation between values of the process parameters and shape-related changes of the produced hollow glass article;
controlling the process parameters of said method, wherein said controlling comprises measuring a shape and mass distribution of a produced hollow glass article online via said at least one camera immediately after shaping of said produced hollow glass article, wherein said hollow glass article stands on a conveyor belt during said measurement, wherein deviations from a reference shape are detected, wherein said deviations include geometric distortions and drunkenness errors, wherein said controlling the process parameters is based on said deviations that are detected and based on the mechanical model depending on the type of deformation detected;
performing an intervention in adjustments of all process parameters according to the type of deformation detected.

2. The method according to claim 1, further comprising the step of recording an IR image and an optical image of the produced hollow glass article, wherein said IR image is used as the basis of the step of controlling.

3. The method according to claim 1, comprising carrying out an incremental approximation of the adjustment of at least one of said process parameter to an optimal value and compensating detected deviations of the shape of the hollow glass article by readjusting the adjustments of other process parameters.

4. The method according to claim 3, further comprising maximizing a number of shear cuts per unit time of the shaping process.

* * * * *